Sept. 28, 1943.  A. J. HORNFECK  2,330,427

TELEMETRIC CONTROL SYSTEM

Filed March 23, 1940  2 Sheets-Sheet 1

Inventor
ANTHONY J. HORNFECK
By Raymond W. Junkins
Attorney

Sept. 28, 1943.  A. J. HORNFECK  2,330,427
TELEMETRIC CONTROL SYSTEM
Filed March 23, 1940   2 Sheets-Sheet 2

Inventor
ANTHONY J. HORNFECK
By Raymond D. Junkins
Attorney

Patented Sept. 28, 1943

2,330,427

UNITED STATES PATENT OFFICE 2,330,427

TELEMETRIC CONTROL SYSTEM

Anthony J. Hornfeck, Cleveland, Ohio, assignor to Bailey Meter Company, a corporation of Delaware Application March 23, 1940, Serial No. 325,630

8 Claims. (Cl. 73—205)

This invention relates to telemetric control systems for producing an electrical effect in accordance with the difference between a plurality of variables. The effect produced may, for example, control suitable means for maintaining a dependent variable in correspondence with a master or independent variable. The variables may be the same or different. One of the variables, for example the independent variable, may be rate of flow, humidity, temperature, pressure or electromotive force, and another of the variables, for example the dependent variable, may be the position of a member. In other cases the independent variable may be the position of a member, and the dependent variable may be rate of flow, humidity, temperature, pressure, or electromotive force.

In accordance with my invention the magnetic coupling between a primary and a secondary coil is varied in correspondence with each variable, so that a voltage is produced in each secondary coil corresponding in magnitude to the magnitude of one of the variables. If the variables are equal or stand in predetermined proportion, the voltages induced in the several secondary coils are equal, or balanced. If proper correspondence does not exist between the variables then a voltage will exist between the secondary coils, which voltage will have a phase depending upon the sense of the departure of the variables from proper correspondence. The phase of the voltage determines the direction of operation of suitable electromagnetic means which may or may not be arranged to alter the value of one of the variables to maintain the same in proper correspondence with another of the variables. More particularly one or the other of a pair of electron discharge devices is rendered conducting selectively in accordance with the phase of the voltage between the secondary coils, and the electron discharge devices in turn control the starting, stopping and direction of movement of suitable electromagnetic means.

Figure 1:
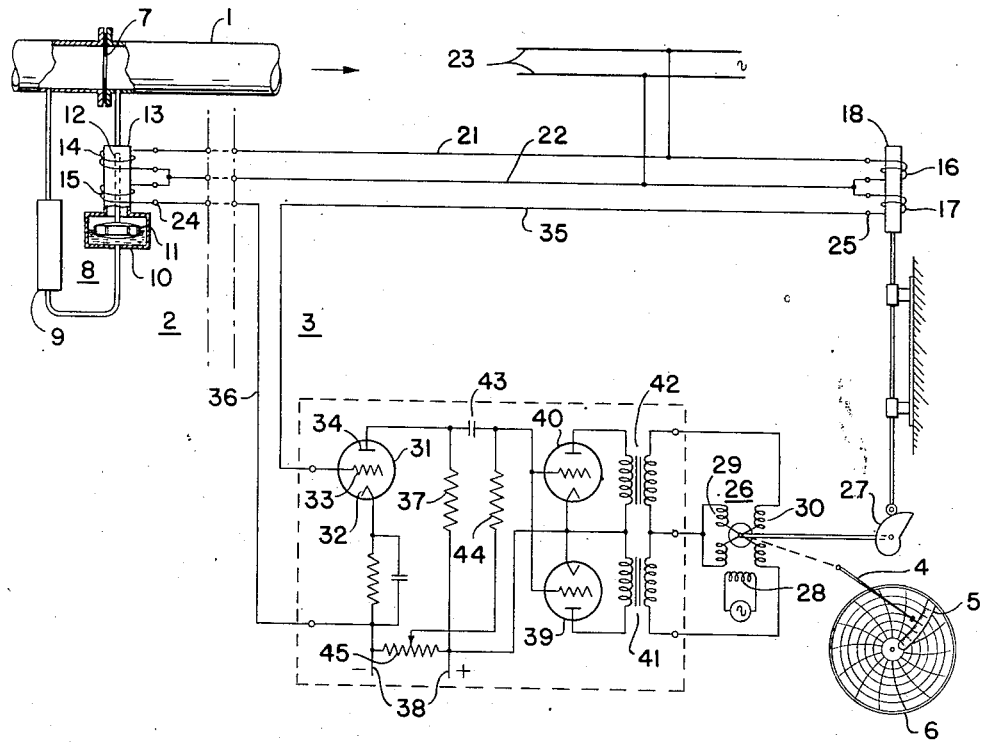
Fig. 1 illustrates diagrammatically a specific embodiment of my invention.

As a specific embodiment I have illustrated my invention in the drawings as adapted to telemeter the magnitude of a variable, specifically rate of flow, from a remote or transmitting station to a local or receiving station. It is evident that in this embodiment rate of flow or position of the transmitting member positioned in correspondence therewith may be considered as the independent variable, and the position of the exhibiting or receiving member as the dependent variable. Lack of correspondence between the independent and dependent variables sets up a voltage, which through suitable relay means acts to vary the magnitude of the dependent variable until proper correspondence is restored.

There is provided both at the transmitter and receiver stations magnetically coupled primary and secondary coils. The magnetic coupling between the transmitter primary and secondary coils is varied in correspondence with changes in the independent variable, and hence the voltage in the transmitter secondary coil will be proportional to the magnitude of the independent variable. The magnetic coupling between the receiver primary and secondary coils is varied in correspondence with changes in the dependent variable, in the specific embodiment described the position of the exhibiting means, and hence the voltage in the receiver secondary coil will be proportional to the magnitude of the dependent variable. If the position of the exhibiting means properly corresponds to the then existing rate of flow, the voltages in the transmitter and receiver secondary coils will be equal. If such correspondence does not exist, then the voltages will not be equal, and a voltage will exist between the transmitter and receiver secondary coils. This latter voltage will be of one phase if the lack of correspondence is in one sense, and of opposite phase if the lack of correspondence is in opposite sense. As for example, the arrangement may be such that upon an increase in the rate of flow a proportionate increase in the voltage in the transmitter secondary coil will result, so that the voltage between the transmitter and receiver secondary coils will be of one phase; and upon a decrease in the rate of flow a proportionate decrease in the voltage induced in the transmitter secondary coil will result, so that the voltage between the transmitter and receiver secondary coils will be of opposite phase. The phase of the voltage causes selective operation of suitable electromagnetic means for altering the position of the exhibiting means to restore the same to proper correspondence with the rate of flow.

Referring now to Fig. 1, I therein illustrate my invention as adapted to telemeter the rate of fluid flow through a conduit 1 located adjacent a transmitting station generally indicated at 2 to a receiver station generally indicated at 3. In the receiver station is an exhibiting means specifically illustrated as a movable index 4 adapted to indicate relative to a suitably graduated scale 5, and record on a rotatable chart 6 the rate of fluid flow through the conduit 1. The chart 6 may be rotated by any suitable clock mechanism (not shown).

Positioned in the conduit 1 is a restriction, such as an orifice 7, for producing a differential pressure varying in functional relation to the rate of fluid flow. Connected across the orifice is a U-tube 8 having legs 9 and 10 in which is a suitable sealing liquid, such as mercury, which will be displaced from one leg to the other until the difference in height in the two legs corresponds to the differential pressure produced by the orifice 7. Disposed in the leg 10 is a float 11 vertically positioned in response to changes in the height of mercury in the leg. Carried by the float 11 is a core piece 12 fabricated of a magnetic material, such as iron or ordinary carbon steel.

The core piece 12 is enclosed in a pressure tight cylindrical housing or casing 13 made of a non-magnetic material, such as brass or a so-called stainless steel, usually being a metallic alloy containing substantial amounts of nickel and chromium.

Surrounding the casing 10 is a primary coil 14 magnetically coupled by the core piece 12 to a secondary coil 15. In the receiver 3 is a corresponding pair of windings comprising a primary coil 16 magnetically coupled to a secondary coil 17 by a core piece 18. The primary coils 14 and 16 are connected by conductors 21 and 22 to a suitable source of alternating current 23. The conductor 22 also serves as a common between the primary and secondary coils and interconnects corresponding ends of the secondary coils 15 and 17. Movements of the core piece 12 cause corresponding variations in the voltage induced in the secondary coil 15 from the primary coil 14. Accordingly, the potential effective at the terminal 24 of the secondary coil 15 will be proportional to the position of the float 11, or to the rate of fluid flow through the conduit 1. Similarly, the voltage induced in the secondary coil 17 from the primary coil 16 will vary in correspondence with the changes in position of the core piece 18; accordingly the potential effective at the terminal 25 of the secondary coil 15 will be proportional to the position of the core piece 18.

If equal potentials exist at the terminals 24 and 25 then the position of the core piece 12 may be said to correspond with that of the core piece 18. However, a change in position of the core piece 12 will, if in one direction, cause a voltage of one phase to exist between the terminals 24 and 25; and of opposite phase if the core piece 12 changes position in opposite direction. Such voltage existing between the terminals 24 and 25 through suitable amplifying and relay means hereinafter to be described, selectively operates a motor 26 in one direction or the other in accordance with the phase of the voltage. As shown, the motor 26 is employed both to position the index 4, and the core piece 18 through a suitable cam 27. The direction of operation of the motor 26 is such that the core piece 18 is moved toward correspondence with the position of the core piece 12, and when such correspondence is obtained the potentials at the terminals 24 and 25 will again be equal.

Assuming, for example, that at some rate of flow through the conduit 1 the voltage induced in the coil 15 is equal to that induced in the coil 17. Then upon an increase in flow from the assumed value the voltage induced in the coil 15 will be greater than that induced in the coil 17. This will cause a voltage of predetermined phase to exist between the terminals 24 and 25. Assuming on the other hand a decrease in flow from the assumed value a voltage of opposite phase will exist between the terminals 24 and 25. Under the first assumption the motor 26 is caused to operate in direction to move the core piece 18 to increase the magnetic coupling between coils 16 and 17 until the voltage induced in the coil 17 is again equal to that induced in the coil 15. Under the second assumption the motor 26 is caused to operate in opposite direction to position the core piece 18 to decrease the magnetic coupling between the coils 16 and 17 until the voltage induced in the coil 17 is again equal to that induced in the coil 15. The position of the motor 26 and any of the elements positioned thereby thus becomes a measure of the rate of fluid flow through the conduit 1.

The motor 26 is shown as being of the type having the field winding 28 energized from a suitable source of alternating current, such as the source 23, and opposed shading pole windings 29 and 30. When the windings 29 and 30 are open circuited or both effectively short circuited, the motor 26 remains stationary. When the pole winding 29 is effectively energized by being short circuited, the motor 26 will rotate in one direction, and when the winding 30 is effectively energized by being short circuited the motor 26 will rotate in opposite direction.

In order that a voltage of one phase between the terminals 24 and 25 will cause, for example, effective short circuiting of the pole winding 29, and a voltage of reverse phase will cause effective short circuiting of the winding 30 I employ an amplifying and control circuit forming the subject matter of an application to John D. Ryder filed in the United States Patent Office on January 17, 1939, Ser. No. 251,388, now Patent 2,275,317, granted November 3, 1942.

The voltage existing between the terminals 24 and 25 is first amplified by means of an electron discharge device 31 having a cathode 32, a grid 33 and a plate 34. The voltage between the terminals 24 and 25 controls the potential relationship between the cathode 32 and grid 33, for as shown the terminal 25 is connected by means of a conductor 35 to the grid 33, whereas the terminal 24 is connected by means of a conductor 36 to the cathode 32. The plate circuit of the electron discharge device 31 includes a resistance 37 and a source of direct current 38. When the potential difference between terminals 24 and 25 is zero a direct current may or may not pass through the plate circuit of the device 31 depending upon the electrical characteristics of the device and the bias of the grid 33.

An alternating current voltage between the terminals 24 and 25 superimposes upon the normal grid bias a pulsating control potential which causes the current in the output circuit to become similarly pulsating in character. The amplitude of the pulsations in the output circuit of the device 31 will depend upon the difference in potential of the terminals 24 and 25 and the phase of the pulsations will depend upon whether the potential at the terminal 24 is greater or lesser than that at the terminal 25.

The pulsating current passing through the output circuit of the device 31 is utilized to control the current transmission through a second pair of electron discharge devices 39 and 40, the output circuits of which are inductively coupled through transformers 41 and 42 to the circuits of the pole windings 29 and 30 respectively. Such direct current as may normally flow through the output circuit of the device 31 will have no effect upon the potential impressed upon the grids of the devices 39 and 40 by virtue of a condenser 43. Upon an alternating current voltage existing between the terminals 24 and 25 however the pulsating component of the current in the output circuit of the device 31 will pass through the condenser 43 and render either the device 39 or 40 conducting selectively in accordance with the phase of the voltage between the terminals 24 and 25.

Such selective control of the devices 39 and 40 is obtained by arranging them to have opposite polarity, that is when the anode of the device 39 is positive the anode of the device 40 is negative, and vice versa. As hereinbefore stated the phase of the pulsating current in the output circuit of the device 31 will depend upon whether the potential of the terminal 24 is greater or lesser than that at the terminal 25. Accordingly, upon the potential at the terminal 24 being greater than that at the terminal 25, pulsating current in the output circuit of the device 31 may render, for example, the grid of the device 39 more positive with respect to its cathode during the same half cycle that its anode is positive, and hence the device will be rendered conducting. Conversely, if the potential of the terminal 24 is less than that of the terminal 25, the pulsating current in the output circuit of the device 31 will be in phase with the plate potential of the device 40, and hence render the grid thereof more positive with respect to its cathode during the same half cycle that its anode is positive, so that the device will be rendered conducting.

When either the device 39 or 40 is rendered conducting, thereby short circuiting the secondary of the transformer 41 or 42 respectively, the impedance of the circuit of the pole winding 29 or 30 is sufficiently reduced to effect rotation of the motor 26 in one direction or the other. Such rotation, as heretofore described, positions the index 4 relative to the scale 5 and chart 6, and simultaneously positions the core piece 18 relative to the coils 16 and 17 to again make the potential induced in the coil 17 equal to that induced in the coil 15.

The devices 39 and 40 may normally be maintained non-conducting by connecting their grids through a resistance 44 to a suitable point on a voltage divider 45 spanning the source 38. To provide a high degree of sensitivity, in some cases it may be desirable to maintain the pole windings 29 and 30 normally energized a predetermined amount. Such may be accomplished by maintaining the electron discharge devices 39 and 40 conducting, which may also be accomplished by connecting their grids to a suitable point on the divider 45. In the latter case the pulsating current originating due to a difference in potential between the terminals 24 and 25 will selectively render one or the other of the devices 39 or 40 more conducting and the other less conducting.

As known, the differential pressure produced by a restriction, such as the orifice 7, varies in non-linear relation to the rate of flow of fluid. As it is usually desirable to have the exhibiting mechanism, such as the index 4, positioned in linear relation to rate of fluid flow rather than differential pressure, it is necessary to provide a means for extracting the non-linear functional relation existing between differential pressure and rate of fluid flow. The cam 27 provides a convenient means for accomplishing this, for by proper shaping of the cam the movement of the index 4 relative to that of the core piece 18 in restoring the voltages induced in the coils 15 and 17 to equality may be made such that the index 4 will be positioned in linear proportion to changes in rate of fluid flow. While in the embodiment of my invention shown in Fig. 1 the cam 27 would be properly shaped to extract the non-linear functional relation existing between differential pressure and rate of fluid flow, it will be evident that when the system is employed to exhibit or control the magnitude of other variables the cam 27 may be shaped as may be found necessary, so that the index 4 will be positioned in linear proportion to changes in the magnitude of the particular variables under consideration.

Figure 2:
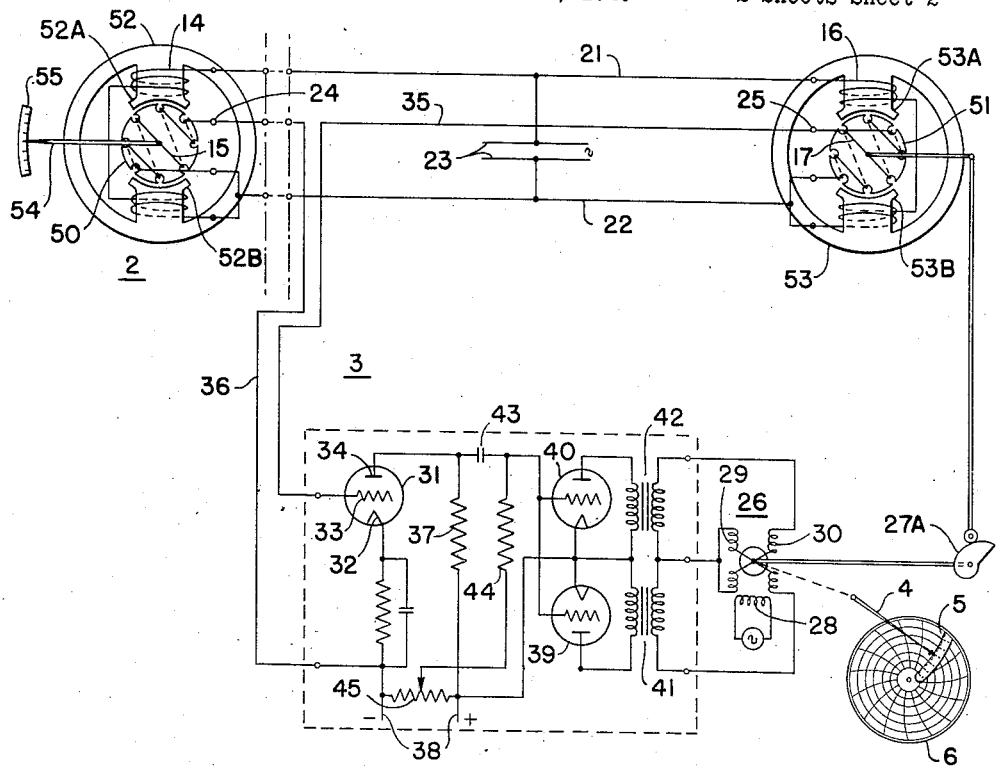
Fig. 2 illustrates diagrammatically a modified form of my invention.

In Fig. 1 I have shown an embodiment of my invention wherein the coils 14, 15 and 16, 17 are magnetically coupled by means of core pieces 12 and 18 respectively, positionable along straight lines between definite limits. In Fig. 2 I show schematically a modified form of my invention wherein the secondary coils 15 and 17 are inductively wound on angularly displaceable round rotor elements 50 and 51 respectively. The primary coil 14 in the transmitter 2 is wound about the salient pole pieces 52A and 52B of a stator element 52. Similarly the primary coil 16 is wound about the salient pole pieces 53A and 53B of a stator element 53.

The rotor element 50 in the transmitter 2 may be positioned through any suitable means in accordance with changes in the magnitude of an independent variable. By way of example I have shown the rotor element 50 adapted to be manually positioned by means of an arm 54 which may be suitably shaped to form an index, and which in cooperation with a suitably graduated scale 55 will give a visual indication of the position of the rotor 50 relative to the stator element 52. The arrangement is such that the position of the arm 54 relative to the scale 55 will be duplicated by the position of the index 4 relative to the scale 5 and chart 6 located in the receiver 3. Generally speaking the position of the rotor element 50 may be taken as a measure of the independent variable and that of the rotor element 51 as a measure of the dependent variable.

The voltage induced in the secondary coil 15 from the primary coil 14 will vary in correspondence with changes in the position of the rotor element 50 relative to the stator element 52. Likewise the voltage induced in the secondary coil 17 from the primary coil 16 will vary depending upon changes in the angular position of the rotor 51 relative to the stator element 53. As explained with reference to Fig. 1 so long as the voltages induced in the coils 15 and 17 are equal the terminals 24 and 25 will be at the same potential. However, upon a change in position of the rotor 50 a voltage will exist between these terminals which voltage will have a phase depending upon whether the potential at the terminal 24 is greater or lesser than that at the terminal 25. Such voltage is effective through the amplifying and relay circuit heretofore described to position the index 4 relative to the scale 5 and chart 6; and simultaneously therewith to position the rotor 51 so as to vary the voltage induced in the coil 17 to again make the potential at the terminal 25 equal to that at the terminal 24.

As explained with reference to the embodiment of my invention shown in Fig. 1, in the embodiment shown in Fig. 2 a suitable cam, such as indicated at 27A, may be interposed between the motor 26 and rotor element 51, so that positioning of the index 4 may bear any desired functional relation to the positioning of the index 54.

It will be observed that because there is no transfer of energy between the primary and secondary coils they and their supporting elements may be built as light and small as physically feasible. As will be readily appreciated by those familiar with the art such construction, particularly of the transmitter, is advantageous inasmuch as the usual device responsive to a variable has a relatively small power output for positioning a mechanical element such as the core piece 12 of Fig. 1, or the rotor element 50 of Fig. 2, and by virtue of the fact that these elements may be made extremely light and small I avoid the necessity of employing a means for amplifying the torque or power output of such variable responsive devices. Further because of the fact that there is no energy transfer between the primary and secondary coils, and also because the element movable by the variable responsive device, such as the rotor 50 of Fig. 2, is constructed without salient poles, there will be no force created tending to move the last named element into a certain position relative to the salient poles of the stator element 52. Consequently there will be no reaction on the variable responsive device tending to destroy the accuracy with which it is positioned.

Figure 3:
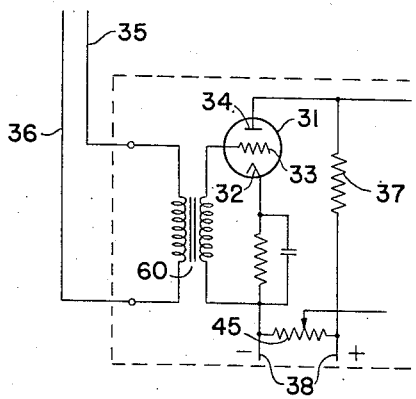
Figs. 3 and 4 are fragmentary views illustrating modifications of the electric circuits shown in Figs. 1 and 2.
Figure 4:
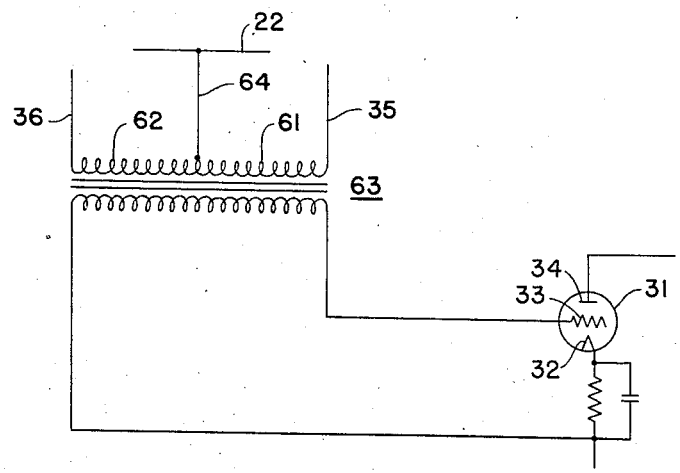

In Figs. 1 and 2 I have shown a circuit arrangement wherein the terminals 24 and 25 are directly connected to the cathode and grid of the electron discharge device 31. In Figs. 3 and 4 I show modified arrangements wherein the terminals are inductively coupled to the grid and cathode of the electron discharge device 31 through suitable transformer means.

Referring to Fig. 3 the conductors 35 and 36 leading from terminals 25 and 24 respectively are shown as being connected to the primary of a step-up transformer 60, the secondary of which is connected to the cathode and grid of the electron discharge device 31. Potentials between the terminals 24 and 25 are stepped-up by the transformer 60 and the stepped-up potential used to control the grid-cathode potential of the electron discharge device 31. Hence the transformer 60 acts to amplify or step-up any potential existing between the terminals 24 and 25 so that a potential of lesser amount between the terminals will sufficiently render one or the other of the electron discharge devices 39 or 40 conducting to operate the motor 26.

In Fig. 4 I show a further modified construction wherein the conductors 35 and 36 from the terminals 25 and 24 respectively are connected to differential primary windings 61 and 62 of a transformer 63. The windings 61 and 62 are connected by a conductor 64 to the common connector 22. The potential impressed across the winding 61 will be that induced in the winding 17, whereas that impressed across the winding 62 will be that induced in the winding 15. The net potential induced in the secondary winding of the transformer 63 will thus be equal to the difference between the potentials induced in the windings 15 and 17. The secondary winding of the transformer 63 is connected so as to control the grid-cathode potential relationship of the electron discharge device 31.

In accordance with the patent statutes I have described certain specific embodiments of my invention. They should, however, be taken as merely illustrative and not as defining the scope thereof.

What I claim as new and desire to secure by Letters Patent of the United States is:

1. A telemetric system, comprising in combination, a primary and a secondary circuit, a source of alternating current for energizing the primary circuit, means normally magnetically coupling said circuits at a first point and a second point so that equal voltages are induced in said secondary circuit at said points and said secondary circuit is in balance, means responsive to the magnitude of a variable for increasing the magnetic coupling at said first point upon change in the magnitude of the variable in one sense and for decreasing the magnetic coupling at said first point upon change in the magnitude of the variable in opposite sense to thereby unbalance said secondary circuit and produce a potential in said secondary circuit having a phase relative to the phase of the alternating current source depending upon the sense of change in the magnitude of the variable, a pair of electron discharge devices each having, a cathode, a grid and a plate, a source of alternating current for energizing the plate circuits of said devices, said plates arranged to have opposite polarity, means coupling said secondary circuit to the grids of said electron discharge devices so that one or the other of said devices is rendered conducting depending upon the phase of the potential in said secondary circuit, and means controlled by the current in the plate circuits of said devices for varying the magnetic coupling between said primary and secondary circuits at said second point to rebalance said secondary circuit.

2. A telemetric system, comprising in combination, a primary and a secondary circuit, a source of alternating current for energizing said primary circuit, means normally magnetically coupling said circuits at a first point and a second point so that equal voltages are induced in said secondary circuit at said points and said secondary circuit is in balance, means responsive to the magnitude of a variable for increasing the magnetic coupling at said first point upon change in the magnitude of the variable in one sense and for decreasing the magnetic coupling at said first point upon change in the magnitude of the variable in opposite sense to thereby unbalance said secondary circuit and produce a potential in said secondary circuit having a phase relative to the phase of the alternating current source depending upon the sense of change in the magnitude of the variable, a pair of electron discharge devices each having a grid, a cathode and a plate, a source of alternating current for energizing the plate circuits of said devices, said plates arranged to have opposite polarity, means coupling said secondary circuit to the grids of said electron discharge devices so that one or the other of said devices is rendered conducting depending upon the phase of the potential in said secondary circuit, a motor having opposed windings which when energized effect operation of said motor in opposite directions, means coupling each of said windings with the plate circuits of one of said devices so that said motor is operated in one direction or the other in accordance with which one of said devices is rendered conducting, and means for varying the magnetic coupling between the primary and secondary circuits at said second point to rebalance said secondary circuit actuated by said motor.

3. A telemetric system, comprising in combination, a primary and a secondary circuit, a source of alternating current for energizing said primary circuit, means normally magnetically coupling said circuits at a first point and a second point so that equal voltages are induced in said secondary circuit at said points and said secondary circuit is in balance, said two circuits comprising a total of three conductors extending between said two points, means responsive to the magnitude of a variable for increasing the magnetic coupling at said first point upon change in the magnitude of the variable in one sense and for decreasing the magnetic coupling at said first point upon change in the magnitude of the variable in opposite sense to thereby unbalance said secondary circuit and produce a potential in said secondary circuit having a phase depending upon the sense of change in the magnitude of the variable, a pair of electron discharge devices, means for selectively rendering one or the other of said devices conducting in accordance with the phase of the potential in said secondary circuit, and means for varying the magnetic coupling between said circuits at said second point operated in one direction when one of the said electron discharge devices is rendered conducting and in opposite direction when the other of said electron discharge devices is rendered conducting to thereby vary the magnetic coupling between said circuits at said second point so that the potential induced thereat in the secondary circuit is again made equal to that induced at said first point.

4. A telemetric system, comprising in combination, a transmitter, a receiver, and a source of alternating current, said transmitter comprising a stator element having a pair of wound poles connected in series across said source of alternating current and a wound rotor element; said receiver comprising a stator element having a pair of wound poles connected in series across said source of alternating current and a wound rotor element connected in loop circuit with said transmitter rotor element, means for positioning said transmitter rotor element relative to said transmitter stator element in accordance with the magnitude of a variable, means selectively controlled by the phase of the potential in said loop circuit resulting from such positioning for relatively moving said receiver stator and rotor elements to maintain the relative positions thereof in correspondence with the relative positions of said transmitter stator and rotor elements, said last-mentioned means including a motor having opposed field windings, means for selectively energizing said field windings comprising a pair of electron discharge devices, each having cathode, grid and plate electrodes, a source of alternating current for energizing plate circuits of said devices, said plates arranged to have opposite polarity, means for simultaneously impressing upon the grids of said devices a common biasing potential varying in magnitude and phase in response, respectively, to variations in magnitude and phase of the effective potential in said loop circuit so that one or the other of said devices is rendered conducting depending upon the phase of the potential in said loop circuit, and means operatively connecting said motor and said receiver stator.

5. A telemetric control system comprising, in combination, a first and a second pair of relatively fixed windings, each pair of windings comprising a primary winding magnetically coupled to a secondary winding, circuit means connecting the respective primary and secondary windings in series, a movable core member for each pair of windings, said core members being longitudinally shiftable along the axes of both windings of the respective pairs, a source of alternating current for energizing the primary windings of each of said pairs of windings, means for shifting the core member of said first pair of windings longitudinally of the axes thereof for varying the magnetic coupling between the primary and secondary windings thereof, and receiver means selectively responsive directionally in accordance with the phase of the effective voltage in the circuit connecting the secondary windings to shift the core member of the second pair of windings to alter the magnetic coupling therebetween to thereby bring the voltage induced in the secondary winding of said last-named pair of windings into equality with the voltage induced in the secondary winding of the first-mentioned pair of windings.

6. A telemetric control system comprising in combination, a first and a second pair of windings each pair comprising a primary winding magnetically coupled to a secondary winding, a source of alternating current for energizing the primary winding of each of said pairs of windings, means responsive to an independent variable for varying the magnetic coupling between the primary and secondary windings of one of said pairs of windings, means responsive to a dependent variable for varying the magnetic coupling between the primary and secondary windings of the other of said pairs of windings, means responsive to the difference in the voltages induced in the secondary windings of said pairs of windings and selectively operated in accordance with the phase of said voltage difference for bringing the value of said dependent variable into a predetermined relation with the independent variable, said last-mentioned means comprising a pair of electron discharge devices each having a cathode, a grid and a plate, a source of alternating current for energizing the plate circuits of said devices, said plates arranged to have opposite polarity, and means for simultaneously impressing on the grid electrodes a common biasing potential varying in magnitude and phase in response to variations in magnitude and phase, respectively, of the effective voltage in said secondary windings so that one or the other of said electron discharge devices is rendered conducting depending upon the phase of the effective voltage in said secondary windings.

7. A telemetric control system comprising in combination, a first and a second pair of relatively fixed windings each pair comprising a primary winding magnetically coupled to a secondary winding, a movable core member for each pair of windings, a source of alternating current for energizing the primary winding of each of said pairs of windings, means for shifting the core member within said first pair of windings for varying the magnetic coupling between the primary and secondary windings thereof, receiver means selectively operated in accordance with the phase of the voltage existing between the secondary windings to shift the other core member within said second pair of windings to alter the magnetic coupling between the primary and secondary windings of second of said pairs of windings to bring the voltage induced in said last named secondary winding into equality with the voltage induced in the secondary winding of the first of said pairs of windings, said receiver means including a motor having opposed field windings and control means therefor comprising a pair of electron discharge devices each having a cathode, grid and a plate, a source of alternating current for energizing the plate circuits of said devices, said plates arranged to have opposite polarity, means operatively coupling the respective plate circuits of said devices with the opposed field windings of said motor, means for simultaneously impressing on the grids of said electron discharge devices a common biasing potential varying in magnitude and phase in response to variations, respectively, in magnitude and phase of the effective voltage in said secondary windings so that one or the other of said devices is rendered conducting to selectively energize the field windings of said motor depending upon the phase of the potential in the secondary windings, and means actuated by the motor for shifting the core member associated with said second pair of windings.

8. A rate of flow meter comprising, in combination, a pair of associated relatively fixed windings, a chamber containing a liquid, a magnetic element positioned in accordance with changes in level of said liquid for varying the magnetic coupling between said windings in accordance with changes in the position of the element, a second pair of associated relatively fixed windings, a source of alternating current, a circuit connecting one winding of each pair directly to said source for parallel energization as primaries of transformers, a second circuit connecting the remaining windings of said pairs in series opposition, and means responsive to the difference in potential induced in the windings of said second circuit for varying the magnetic coupling between the second pair of windings to maintain said magnetic coupling in predetermined proportion to the magnetic coupling between said first pair of windings, said two circuits totalling three conductors extending between the two pairs of windings.

ANTHONY J. HORNFECK.